(12) United States Patent
Gromadskyi et al.

(10) Patent No.: US 11,929,526 B2
(45) Date of Patent: Mar. 12, 2024

(54) METHOD FOR BONDING TWO PLATES TOGETHER FOR A FUEL CELL, ESPECIALLY GLUING BIPOLAR PLATES IN A FUEL CELL

(71) Applicant: fischer Eco Solutions GmbH, Achern-Fautenbach (DE)

(72) Inventors: Denys Gromadskyi, Aalborg Øst (DK); Søren Andreasen, Vadum (DK); Morten Sørensen, Gistrup (DK); Jakob Bork, Støvring (DK)

(73) Assignee: FISCHER ECO SOLUTIONS GMBH, Achern-Fautenbach (DE)

( * ) Notice: Subject to any disclaimer, the term of this patent is extended or adjusted under 35 U.S.C. 154(b) by 541 days.

(21) Appl. No.: 17/293,079

(22) PCT Filed: Nov. 12, 2019

(86) PCT No.: PCT/EP2019/080923
§ 371 (c)(1),
(2) Date: May 12, 2021

(87) PCT Pub. No.: WO2020/099351
PCT Pub. Date: May 22, 2020

(65) Prior Publication Data
US 2021/0408560 A1 Dec. 30, 2021

(30) Foreign Application Priority Data
Nov. 12, 2018 (DK) .......................... PA 2018 70738

(51) Int. Cl.
*H01M 8/0297* (2016.01)
*C09J 5/06* (2006.01)
*C09J 127/16* (2006.01)

(52) U.S. Cl.
CPC ............ *H01M 8/0297* (2013.01); *C09J 5/06* (2013.01); *C09J 127/16* (2013.01);
(Continued)

(58) Field of Classification Search
CPC .... H01M 8/0297; C09J 5/06; C09J 2301/306; C09J 2203/33; C09J 2427/00; C09J 127/16
See application file for complete search history.

(56) References Cited

U.S. PATENT DOCUMENTS 5,688,293 A 11/1997 Oliver
6,387,557 B1 5/2002 Krasij
(Continued)

FOREIGN PATENT DOCUMENTS

CN 112292770 A * 1/2021 .......... H01M 4/0404
DK 201800024 U1 3/2018
(Continued)

OTHER PUBLICATIONS

Machine Translation of CN-112292770-A (Nov. 22, 2023) (Year: 2023).*

(Continued)

*Primary Examiner* — Matthew J Merkling
(74) *Attorney, Agent, or Firm* — Cermak Nakajima & McGowan LLP; James Creighton Wray

(57) ABSTRACT

A method for bonding two plates together for a fuel cell, wherein the method comprises applying an adhesive to the surface of at least one of the plates and pressing the two plates together with the adhesive in between. The adhesive contains a mixture in the range of 0.01% to 30% PVDF and a solvent, and optionally a surfactant.

10 Claims, 7 Drawing Sheets

(52) U.S. Cl.
CPC ...... *C09J 2203/33* (2013.01); *C09J 2301/306* (2020.08); *C09J 2427/00* (2013.01)

(56) References Cited

U.S. PATENT DOCUMENTS

| | | |
|---|---|---|
| 2002/0048704 A1 | 4/2002 | Murai |
| 2005/0008911 A1 | 1/2005 | Kaye |
| 2007/0207364 A1 | 9/2007 | Abd Elhamid |
| 2013/0034801 A1 | 2/2013 | Pavlik |
| 2015/0093629 A1* | 4/2015 | Sayre .................. H01M 50/545 |
| | | 429/185 |
| 2018/0047962 A1 | 2/2018 | Honda |
| 2019/0245183 A1* | 8/2019 | Jeong .................. H01M 50/417 |

FOREIGN PATENT DOCUMENTS

| | | |
|---|---|---|
| EP | 0954043 A1 | 11/1999 |
| WO | 03007314 A1 | 1/2003 |
| WO | 2009010066 A1 | 1/2009 |
| WO | 2009010067 A1 | 1/2009 |
| WO | 2018072803 A1 | 4/2018 |

OTHER PUBLICATIONS

Internet site: https://www.solvay.com/sites/g/files/srpend221/files/2018-08/Solef-PVDF-Typical-Properties_EN-v2.7_0.pdf.

* cited by examiner

METHOD FOR BONDING TWO PLATES TOGETHER FOR A FUEL CELL, ESPECIALLY GLUING BIPOLAR PLATES IN A FUEL CELL

This application claims the benefit of Danish Application No. PA 2018 70738 filed Nov. 12, 2018 and PCT/EP2019/080923 filed Nov. 12, 2019, International Publication No. WO 2020/099351 A1, which are hereby incorporated by reference in their entirety as if fully set forth herein.

FIELD OF THE INVENTION

The present invention relates to bonding components, especially plates, together for fuel cells, for example fuel cell stacks, in particular bipolar plates in a fuel cell.

BACKGROUND OF THE INVENTION

International patent applications WO2009/010066 and WO2009/010067 by Serenergy disclose proton exchange membrane (PEM) fuel cells where the membrane is sandwiched between rigid separator plates, especially bipolar plates, which mainly contain graphite and a binder.

In connection with fuel cell stacks, especially for PEM (proton exchange membrane) fuel cells, the term separator plate is used for a rigid plate that separates membranes with a flow structure, typically channels, for flow of hydrogen fuel and oxygen-containing gas, and potentially also for flow heat transfer liquids, for example water, triethylene glycol (TEG), mineral oil or silicone oil for cooling. Separator plates include bipolar plate, cooling plates, anode plates and cathode plates. A bipolar plate has a first side with a first flow channel field for provision of hydrogen fuel to the fuel cell membrane and an opposite, second side with a second flow channel field for provision of oxygen to the neighbouring cell membrane. The oxygen is typically provided from air. In alternative configurations for fuel cells, there is provided an anode plate with one side having a flow channel field for providing hydrogen to the fuel cell membrane and a cathode plates have one side with a flow channel field for providing oxygen to the fuel cell membrane. The membrane is then provided between the anode plate and the cathode plate. Optionally the anode plate or the cathode plate or both have an opposite, second side which has a flow channel field for coolant flow, for example water as a coolant. The term separator plate also includes a cooling plate having on both sides a water flow channel field for providing cooling to corresponding anode and cathode plates adjacent to the cooling plate. Examples of various configurations are given in WO2009/010066 and WO2009/010067, where also the use of a cooling plate between an anode plate and a cathode plate is disclosed.

An overview of composites for production of bipolar plates is disclosed in the article "A Review of Thermoplastic Composites for Bipolar Plate Materials in PEM Fuel Cells" by Yeetsorn et al., published in the book, "Nanocomposites with Unique Properties and Applications in Medicine and Industry" ISBN 978-953-307-351-4 edited by Dr. John Cupoletti and published on the Internet on WWW.intechopen.com in 2011. In this article, the authors discuss that thermoplastic resins, such as polypropylene (PP), polyethylene (PE), poly (vinylidene fluoride) (PVDF), liquid crystalline polymer (LCP), poly (phenylene sulfide) (PPS), and fluoropolymer are used less in bipolar plate fabrication than thermosetting resins. As a reason, this disclosure states that thermosetting resins have low viscosity, and thereby contain a higher proportion of conductive fillers. Especially, epoxy resin is seen as a popular choice for a polymer composite bipolar plate production.

A further production process is disclosed in WO2018/072803 assigned to Serenergy. Exemplified are bipolar plates and cathode/anode plate assemblies. For example, a cathode plate is combined with a an anode plate back to back to form a bipolar assembly with a cooling channel field in between, the cooling channel field being part of the back-to-back assembly or provided by a cooling plate between the back of the cathode plate and the anode plate.

Typically, gaskets are used for tightness between the various plates. In many cases flouropolymers are used, for example as discussed in Danish utility model DK201800024U1. Gasket materials containing polyvinylidine fluoride (PVDF) are disclosed in U.S. Pat. No. 5,688,293 and US2005/008911. A further example of is disclosed in US2007/207364, in which a mixture comprising PVDF is dissolved in a solvent, for example propylene or ethylene carbonate, and the applied to the bipolar plate, for example by painting or screen brushing, and then heated under pressure, for example at a temperature between 150° C. and 200° C. with a duration up to 5 hours.

Resins of fluoropolymers are available by the company Solvay®, especially marketed as Solvay® Specialty Polymers. PVDF polymers are marketed under the registered trademarks Solef®, Halar®, Hyflon®, and Hylar®, for example as disclosed in the property sheets disclosed on the following Internet sites: https://www.solvay.com/sites/g/files/srpend221/files/2018-08/Solef-PVDF-Typical-Properties_EN-v2.7_0.pdf The materials for gaskets need to chemically withstand the materials in the fuel cell and the heat in it and has to provide long term tightness despite expansion and contraction of the components in the fuel cell stack. The great variety of suggestions for materials and types of gaskets reflects the ongoing effects to improve longevity of fuel cell stacks.

DESCRIPTION/SUMMARY OF THE INVENTION

It is therefore the object of the invention to provide an improvement in the art. Especially, it is an objective to provide an improved method for creating long-lasting tight sealing between plates in fuel cells, for example fuel cell stacks. The tight sealing is provided with a polymer adhesive that is used as bonding and gasket between plates.

The term "fuel cell" is used herein for individual fuel cells as well as for fuel cell stacks.', unless explicitly specified, for example when mentioned as "individual fuel cell".

For example, a fuel cell stack comprises an anode plate and a cathode plate that are combined into a bipolar plate assembly by being attached to each other back-to-back with a sealed cooling-liquid flow-field in between. In this embodiment, the polymer material is used as glue.

The invention is useful for individual fuel cells and fuel cell stacks, particular focus is on proton exchange membrane (PEM) fuel cells, especially high-temperature proton exchange membrane (HTPEM) fuel cells.

To achieve correct functionality of a stack of plates in such fuel cell, including delivery of the reactants, distribution of the coolant fluid and removing of the side products, the key requirements for the gasket material, especially adhesive layer (glue), should be imply the following:
the material must be chemically and electrochemically inert with gases and/or liquids utilized in the fuel cell;

the material must be thermostable at operation temperature of the fuel cell;

the material must be impermeable for gases/liquids circulated in the fuel cell;

the material must have melting point lower than melting point and decomposition temperature of other components, particularly polymer binders, contained in the plates used in the fuel cell;

the material must demonstrate good adhesion to the materials used in the plates for the fuel cell.

These requirements are met by thermoplastic fluoropolymers, in particular polyvinylidene difluoride (PVDF) and its co-polymers, as they are insoluble in water, do not react with mineral acids, have melting point reaching 175° C. for some products and their thermal decomposition takes place only above 375° C.

In the following a mixing method is explained for the adhesive as well as a special bonding method that results in good longevity as well as proper adhesion. The method has been developed for fuel cells, in particular for gluing a cathode plate and an anode plate back-to-back to form a bipolar plate, with or without a cooling flow plate or cooling flow field in between. However, the adhesive and the specific gluing method can also be used to glue other components of a fuel cell, for example fuel cell stack, together, especially plate-formed components, such as membrane frames with separator plates.

The adhesive is mixed as follows. PVDF is mixed and dissolved in a solvent, typically by heating and stirring at the same time. Optionally, the PVDF is added in multiple portions, where one portion is added when the previous portion has been dissolved or substantially dissolved.

PVDF is mixed with the solvent at a concentration in the range of 0.01% to 30%, for example in the range of 1% to 25%, optionally in the range of 10% to 20%, by weight PVDF relatively to the weight of the solvent for providing the adhesive. The PDVF contains homopolymers of PVDF or copolymers of PVDF or both. Especially useful are PVDF homopolymers with high molecular weight, for example a product as Solef® 6020 from Solvay®.

Examples of solvents used alone or in combination include acetone, dimethyl acetamide, dimethyl formamide, dimethyl sulfoxide, hexamethylphosphoramide, methyl ethyl ketone, N-Methyl-2-pyrrolidone, tetrahydrofuran, tetramethyl urea, tributyl phosphate, tricresyl phosphate, triethyl phosphate, trimethyl phosphate. Good results have been obtained experimentally with dimethyl acetamide. In some embodiments, the solvent comprises more than 50% dimethyl acetamide, for example more than 75%.

Good experimental results with the adhesive have been obtained when adding a surfactant, especially non-ionic surfactant, for example at a volume concentration in the range of 0.1% to 10%, optionally in the range of 1% to 4%, relatively to the solvent volume. Hypermer™, Tween® from Croda International® and Triton™ from Dow Chemical® are possibilities for such additives. A useful concentration of Triton™ X-100, also known as octyl phenol ethoxylate, in the solvent has been found in the order of 2 vol. %. The surfactants help forming homogeneous liquid mixture with PVDF, reduce surface tension and improve bonding of the adhesive layer with the surface of the plate due to easier penetration of the polymer into top layers of the plate using its natural micro-roughness and porosity, especially for plates molded according to WO2018/071803. In some embodiments, the non-ionic surfactant comprises more than 50% octyl phenol ethoxylate, for example more than 75%.

The adhesive is applied to the surface of the plate-formed component, for example cathode plate or anode plate or both, or to other plate-formed components, for example a rigid frame of the membrane in a fuel cell.

Once, the adhesive is on the surface, water, typically deionized water, is added to the adhesive, which causes precipitation of the PVDF. When using a solvent that mixes with water, for example dimethyl acetamide, it leads to precipitation of the PVDF, as it does not mix with the water. This crystallization along with the precipitation accelerates the time until the adhesive is ready for bonding. In contrast to the prior art, where elevated temperatures are used for evaporation, the described method can be used a room temperature for the evaporation phase, while still being faster than the method of the prior art After the evaporation of the solvent, the adhesive is ready for bonding. For this, the components to bond, for example the two plates, are hot-pressed together at elevated temperature. The temperature during hot-pressing is above the melting temperature of the PVDF, for example above 171° C., after which the temperature is decrease while still under pressure until the temperature is below the crystallization temperature of the PVDF, for example 133° C., the temperature examples being valid for the PVDF of the type marketed as Solef® 6020.

For example the pressure is in the range of 1 kPa to 10 kPa, optionally in the range of 3 kPa to 7 kPa. Experimentally, a value of 5 kPa resulted in good adhesion.

Despite some apparent similarities with the disclosure of US2013/0034801, in which bipolar plates are bonded with PDVF polymers, there are some key differences between these two processes: In the described procedure above, a homogeneous multi-component liquid mixture is used to form the adhesive layer with the required properties, where PVDF is used as the bonding material, dimethyl acetamide is used as the liquid media that is dissolving the PVDF, water is used as an agent provoking sedimentation of PVDF and removing dimethyl acetamide, octyl phenol ethoxylate, for example Triton™ X-100, as a surfactant that accelerates dissolution of PVDF and enhances penetration of the adhesive into the plate's surface. In contrast to such liquid adhesive, the polymers used in US2013/0034801 are used to make a glue in a solid state. The above described adhesive is provided as a homogeneous liquid mixture, and forming of the adhesive layer can occur at room temperature, while there is applied thermal activation for the polymers utilized in US2013/0034801. The PVDF-based adhesive is applied as a liquid solution the viscosity and surface tension of which can be adjusted within a wide parameter range in dependence of the actual requirements, whereas viscosity of the molten solid polymers used in US2013/0034801 can only be varied very little and only by changing the temperature. Due to very good adhesion of the adhesive composition to the plate's surface, there is no need for a recess that fixes the adhesive layer, in contrast to US2013/0034801. As a result, the compression that is required to glue the plates together is much lower than in US2013/0034801.

SHORT DESCRIPTION OF THE DRAWING

The invention will be explained in more detail with reference to the drawing, where FIG. 1a is a principle sketch of a fuel cell assembly with a cathode plate and an anode plate placed back-to-back and combined into a bipolar plate with a cooling channel field in between;

FIG. 1c is a principle sketch of a fuel cell assembly with a cathode plate and an anode plate placed back-to-back and combined into a bipolar plate without a cooling channel field in between;

Figure 3:
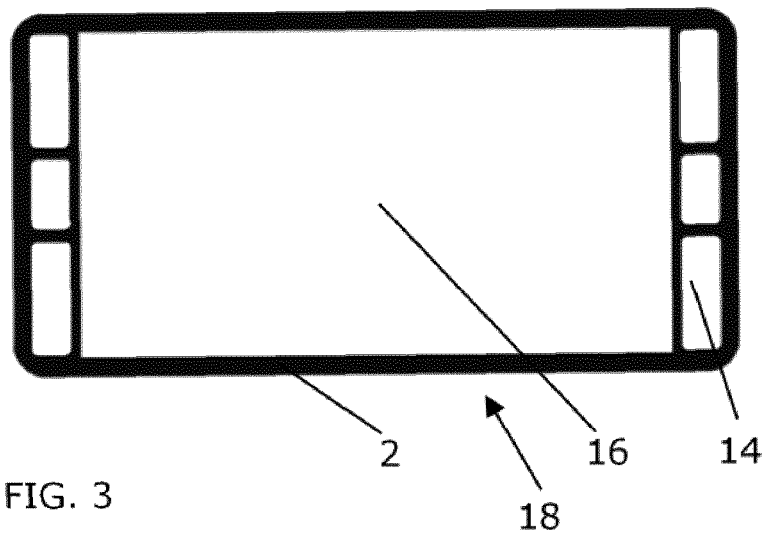
Figure 4:
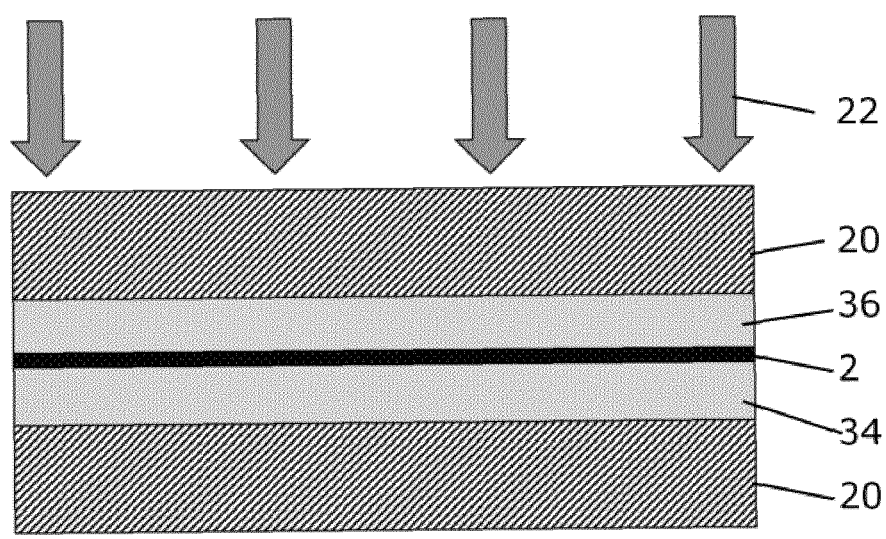
Figure 5A:
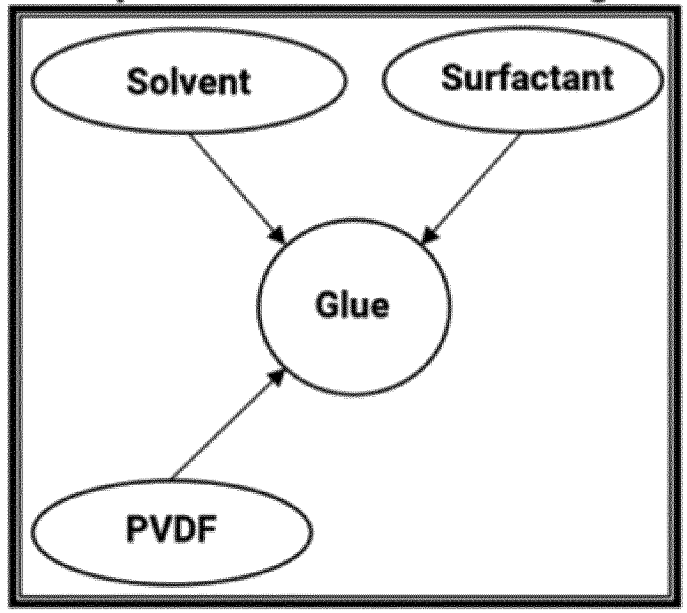
Figure 5B:
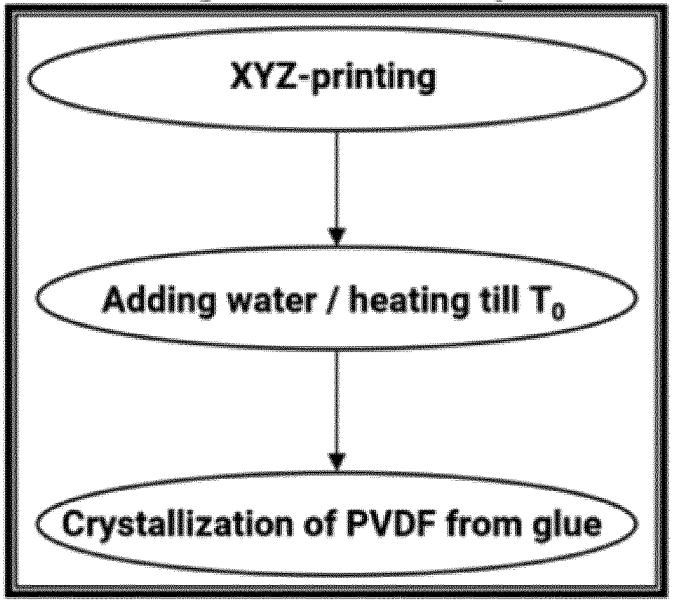
Figure 5C:
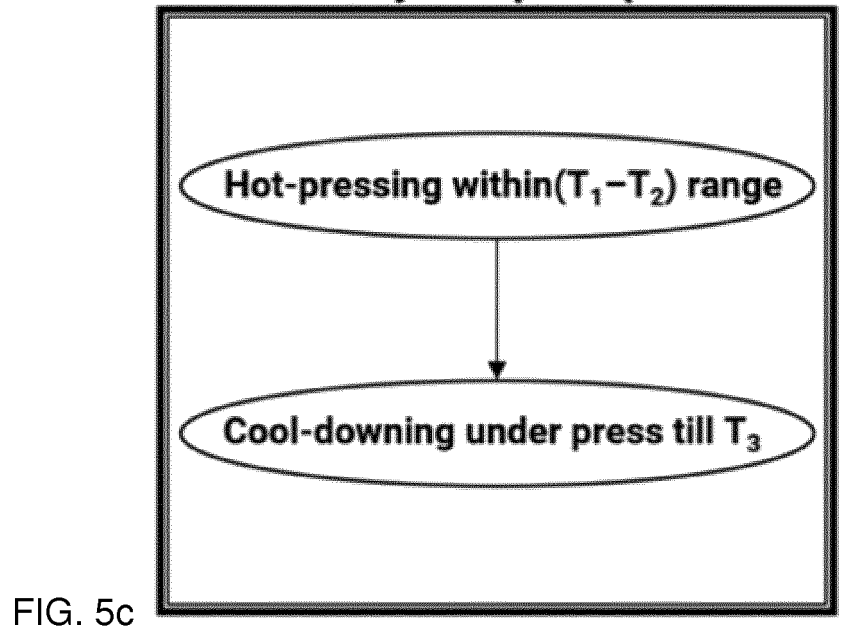
Figure 6:
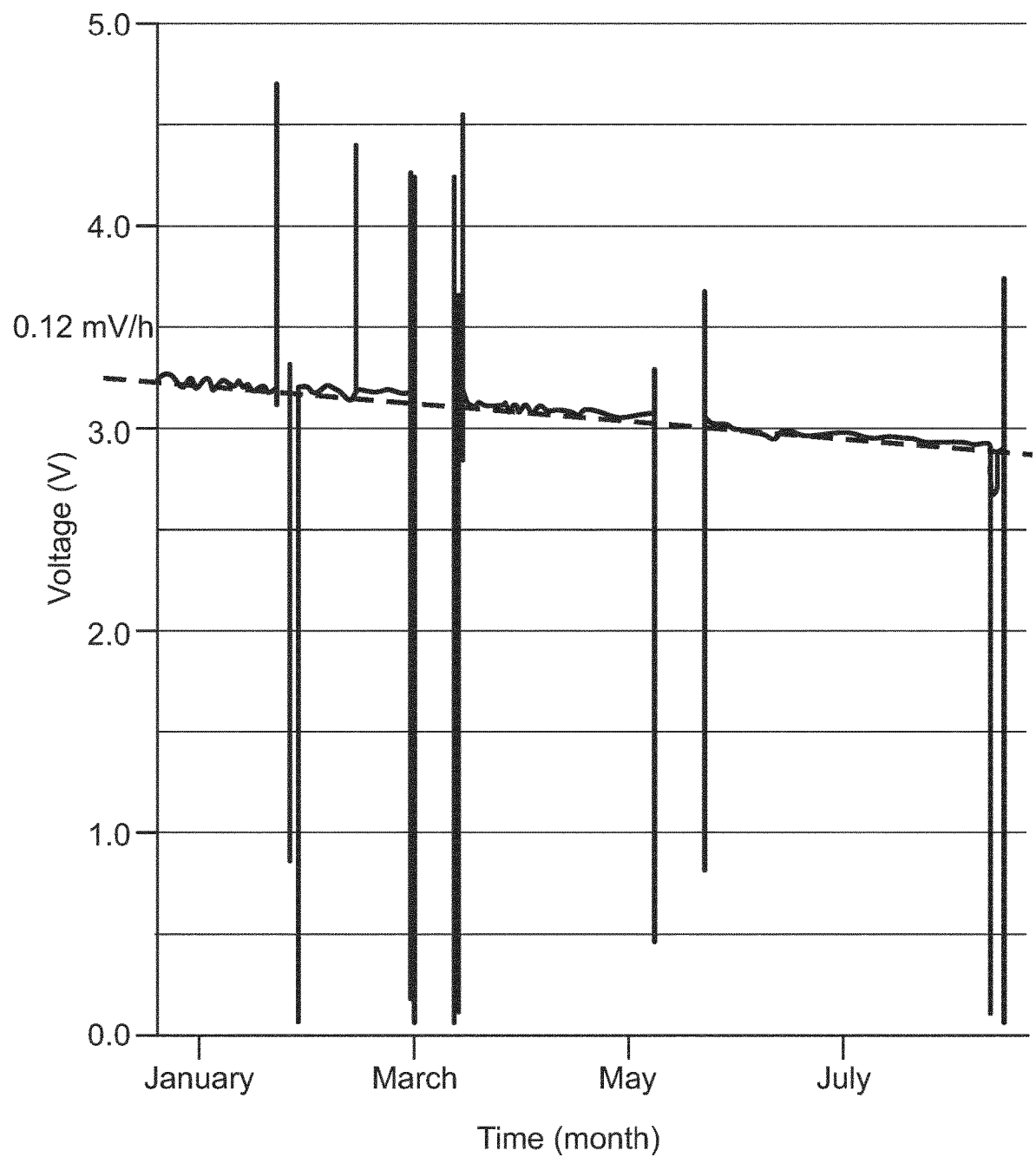

FIG. 3 simplified drawing of a plate for gluing,

FIG. 4 is a principles sketch for pressing the plates together while gluing;

FIG. 5a illustrates a first step in a useful process for mixing the adhesive;

FIG. 5b illustrates a possible way of applying the adhesive to a surface;

FIG. 5c illustrates a possible way of assembling the plates;

FIG. 6 illustrates performance results.

DETAILED DESCRIPTION/PREFERRED EMBODIMENT

Reference is made to fuel cell stacks and plates therefore as well as their production, for example production using polymer and carbon powder, as described in WO2018/071803 by SerEnergy. Taking offset in FIGS. 6 and 7 of this disclosure WO2018/071803, fuel cell assemblies are shown in FIGS. 1a and 1b, in which a bipolar assembly of a cathode plate 34 with a cathode side 26 and an anode plate 36 with an anode side 28 is illustrated with a cooling flow channel field in the space 32 in between the back sides of the cathode plate 34 and anode plate 36, respectively, optionally with a cooling plate 38 inserted, as illustrated in FIG. 1b.

Figure 1A:
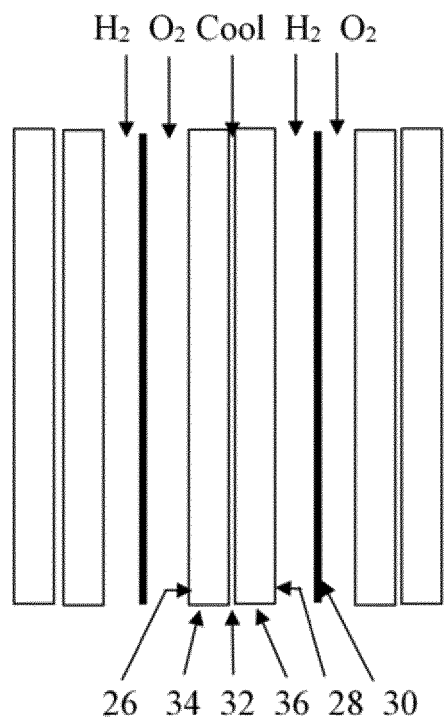
Figure 1B:
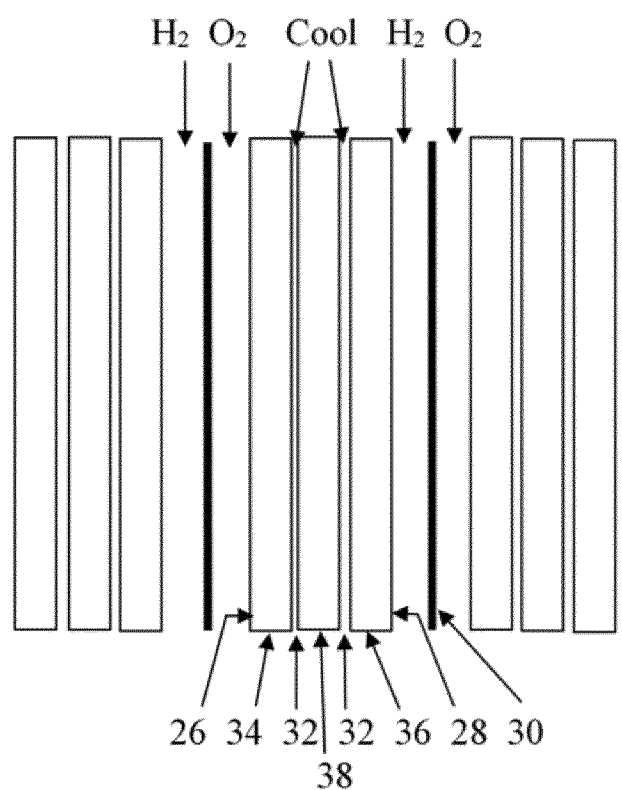
FIG. 1b is a principle sketch of a fuel cell assembly with a cathode plate and an anode plate placed back-to-back and sandwiching a cooling plate.

For the assembly in FIG. 1a, the cathode plate 34 or the anode plate 36 or both are provided with a flow channel pattern integrated in the plates, for example provided by milling the flow channel field into the plate or by molding the plate with such flow channel field.

The cathode plate 34 and the anode plate 36 are glued together with an adhesive, optionally with the cooling plate 38 in between as part of the glued assembly.

Figure 1C:
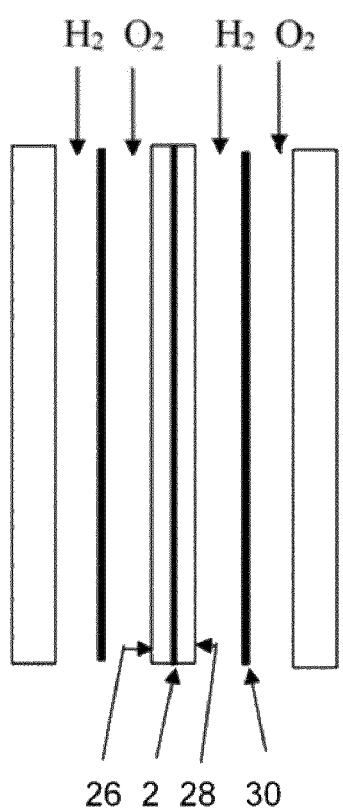

In some embodiments a cathode plate 34 and an anode plate 36 are glued together back-to-back without a cooling flow in between these two plates, which is illustrated in FIG. 1c, also indicating the adhesive 2 used for gluing. The term back-to-back is used for fastening the back sides of the cathode and anode plates, where the back sides are opposite to the cathode side 26 and the anode side 28 of the respective plate, the anode side and the cathode side of opposing anode plate and cathode plate are facing each other and provided on either side of the membrane 30. At the anode side 28, a hydrogen flow is provided for donating protons to the electrolytic membrane 30, and at the cathode side 26, oxygen or air is provided or other fluid flows for accepting protons from the membrane 30. The cathode fluid, typically oxygen or air, is used as a cooling medium for cooling the bipolar plate. For example, the cathode side 26 of the final bipolar plate assembly is provided with a serpentine channel pattern. Exemplary details of the channel patterns and other details of the bipolar plate are explained in WO2009/010066 and WO2009/010067.

The adhesive 2 can also be used for gluing other components together in the fuel cell stack.

Figure 2:
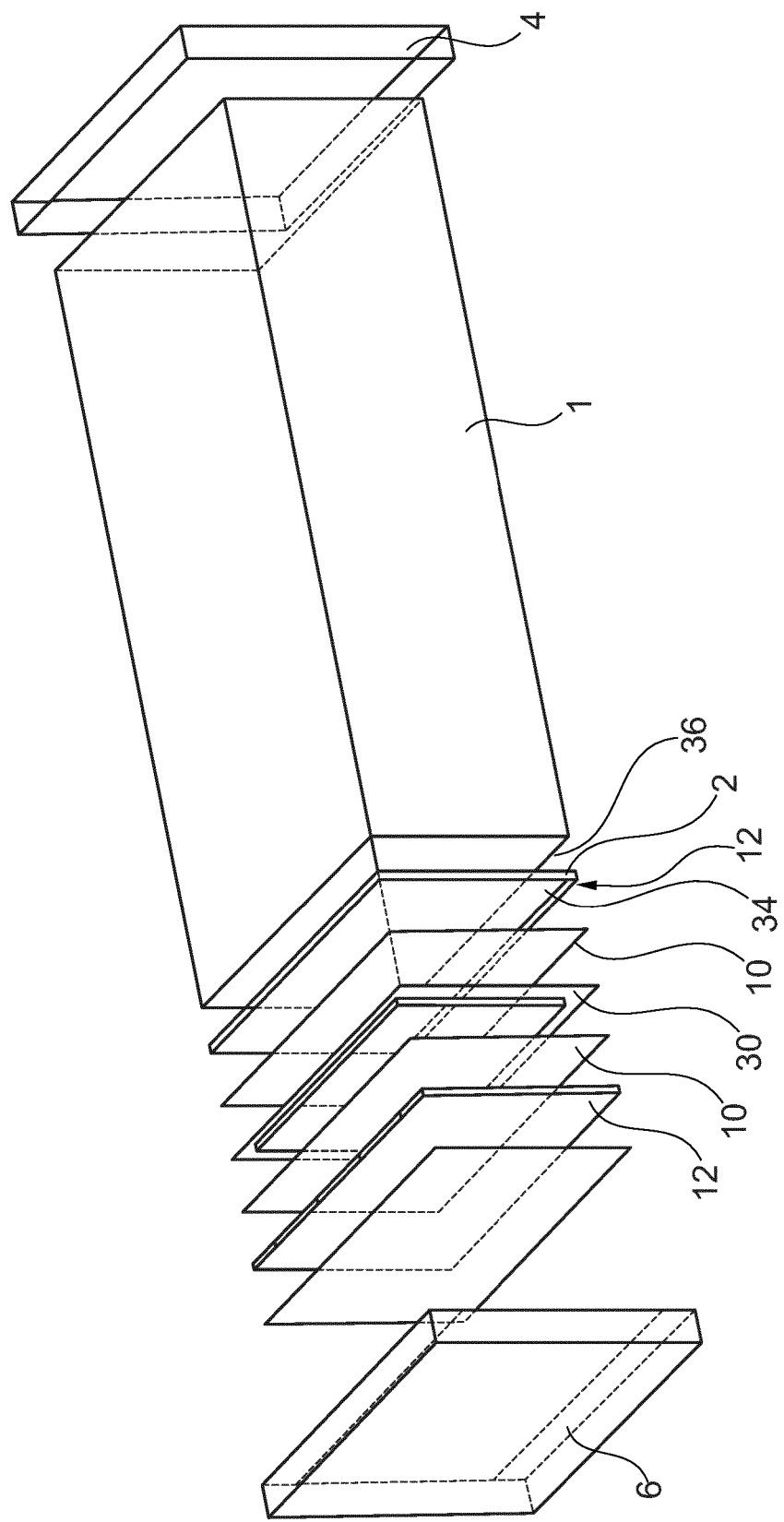
FIG. 2 is an example of a fuel cell assembly.

FIG. 2 illustrates an embodiment with a PEM fuel cell stack 1 comprising a plurality of bipolar plates 12 assembled between endplates 4 and 6 that comprises manifolds through which the various fluids are guided. Proton exchange membranes (PEM) 30 between adjacent bipolar plates 12 are sealed to the bipolar plates 12 and against the environment by sealants 10. In FIG. 2, the bipolar plate 12 is illustrates as a bipolar assembly of a cathode plate 34 and an anode plate 36 glued back-to-back with an adhesive 2, similar to the illustration of FIG. 1c.

FIG. 3 is a simplified drawing of a plate 18, for example cathode plate 34, anode plate 36, or bipolar plate 12, onto which adhesive 2 is applied for gluing in onto other components of the fuel cell stack. The plate 18 comprises inlet and outlet manifolds 14 for transport of cooling fluid, oxygen, fuel, or vapor to and from the flow channel field 16.

To assemble a cathode plate 34 and an anode plate 36 into a bipolar plate 12, the adhesive 2 layer must cover at least one of the plates, but covering both plates is often leading to improved adhesion. In FIG. 3, the plate is illustrated in a simplified design with inlet and outlet manifolds 14 for use in the fuel cell, particularly in a PEM fuel cells and more particularly in a HTPEM fuel cell.

However, the principle of gluing applies equally well to plate components of other type of fuel cells, as already mentioned above.

The fuel cell as illustrated and explained in detail is an illustrative example for which the adhesive and gluing methods described herein has been found especially useful.

For example, the adhesive is applied by spraying, printing, or painting, It should be mentioned that forming of the adhesive layer on the plate's surface is typically not limited by the specific design of the plate, including its dimensions or the presence or absence of gas flow channels.

A scheme of a useful process in illustrated as consecutive steps I, II, and III in FIG. 5a, FIG. 5b, and FIG. 5c.

In the first step, as illustrated in FIG. 5a, PVDF is mixed and dissolved in a solvent, typically by heating and stirring at the same time.

The adhesive contains homopolymers of PVDF or copolymers of PVDF. Especially useful are PVDF homopolymers with high molecular weight, for example a product as Solef® 6020 from Solvay®. The polymer with PVDF polymer is completely dissolved in a polar nonaqueous solvent or mixtures of such solvents.

Examples of solvents used alone or in combination include acetone, dimethyl acetamide, dimethyl formamide, dimethyl sulfoxide, hexamethylphosphoramide, methyl ethyl ketone, N-Methyl-2-pyrrolidone, tetrahydrofuran, tetramethyl urea, tributyl phosphate, tricresyl phosphate, triethyl phosphate, trimethyl phosphate. Good results have been obtained with dimethyl acetamide.

Advantageously, non-ionic surfactants are also added to the solvent or solvent mix. For example, Hypermer™, Tween® from Croda International and Triton™ from Dow Chemical families are possibilities for such additives, typically in concentration up to 10 vol. % based on amount of the solvent. A useful concentration of Triton™ X-100, also known as octyl phenol ethoxylate, in the solvent has been found in the range of 2 vol. %. The surfactants help forming homogeneous liquid mixture with PVDF, reduce surface tension and improve bonding of the adhesive layer with surface of the plate due to easier penetration of the polymer into top layers of the plate using its natural micro-roughness and porosity, especially for plates molded according to WO2018/071803. Optionally, for better adhesion, the surface roughness of the plate can be increased via surface treatment with sand paper or other abrasive materials.

Advantageously, the concentration of PVDF is varied from 0.01 to 30 wt. % based on amount of the solvent. This is much lower than the concentration of 60% PVDF in propylene carbonate as disclosed in US2007/0207364, where it is disclosed for coating and forming PVDF gaskets on outer area of bipolar plates or membrane-electrode assemblies. A concentration of 15 wt. % has been found useful in order for the adhesive not to be highly viscous, which can cause difficulties when applying the adhesive.

It should be mentioned that dissolution of polymer in the solvent or solvent mix typically occurs slowly, why it can be useful to add the polymer in small portions to the solvent already containing the surfactant while simultaneously stirring and heating, for example till 100° C. When a required concentration is achieved, the PVDF-containing mixture is cooled-down to room temperature.

As illustrated in FIG. 5b, a possible way of applying the adhesive to the surface of the plate is by pumping it by a syringe through a tip at the end of a needle. Advantageously, for high precision, the syringe is mounted to a XYZ-printing table that squeezes the mixture out of the syringe via the tip directly onto the plate's surface. Operating with diluted solutions allows better to distribute PVDF-based glue thereon, which as a result forms a thin and at the same time dense layer. Also, a diluted adhesive prevents overloading of the syringe.

Printing processes are carried out at temperature which does not exceed the boiling point of the solvent that is used in the adhesive, for example below 165° C. for dimethyl acetamide. Generally, it has been found useful to work at room temperature due to slower evaporation of the solvent from the glue.

In some experiments, after covering the plate with PVDF/ dimethyl acetamide/surfactant (Triton™ X-100) mixture, there have been used two options for crystallizing the PVDF in the adhesive layer.

In one option, liquid is removed from the adhesive mixture via heating to temperature no higher than $T_0$, where $T_0$ is boiling point of the solvent used, for example 165° C. for dimethyl acetamide.

In another option, which is also illustrated in FIG. 5b, which leads to faster crystallization, deionized water is added to the mixture, once the mixture is coated on the plate's surface, for example by spraying the water onto the adhesive. In order for the water not to evaporate, the temperature of the adhesive in this step is below 100 degrees. Water is chosen, as it is easily mixed with dimethyl acetamide and Triton™ X-100 but not absorbed by PVDF, leading to its precipitation. It was found that the faster crystallization by adding water minimizes the risk for undesirable flow of the adhesive during hardening. The polymer was uniformly distributed on the surface of the plate and strongly bonded with the composite material of the plate, forming a film-like structure having specified thickness and width within a few seconds when water was added, while the first option with the heating process required significantly longer time for curing. For example, heating duration of the PVDF gaskets coated from concentrated solutions reaches 5 h as disclosed in US 2007/0207364, whereas the crystallization with water is many-fold faster and therefore highly advantageous.

A possible gluing method is explained in the following. When crystallization is complete, one or more pairs of the plates are placed in a pressing tool, for example hot-pressing tool, at position providing contact of the entire area coated with an adhesive layer. Connected in such way inside the press, the plates are compressed, for example as illustrated in FIG. 4.

FIG. 4 is a principle sketch, where a bipolar assembly with a cathode plate 34 and an anode plate 36 are placed back-to-back and with adhesive 2 in between two press jaws 20, and pressure 22 is applied, optionally with heat. The method can also be applied for other plate-formed components.

A useful compression value that is sufficient for proper for gluing has been found in the range of 1 kPa to 10 kPa, for example around 5 kPa.

If the plate is made of a composite with a thermoplastic polymer, the temperature T of the adhesive layer is kept between the melting point $T_1$ of the PVFD and the meting point $T_2$ of the polymer binder of the plate material, as also illustrated in FIG. 5c. It is important to note, that the bipolar plates are kept under press until the temperature of the adhesive layer reaches $T_3$ which is the crystallization point of the PVDF. The values $T_1$ and $T_3$ are defined by melting and crystallization points, respectively, of the specific type of PVDF used, depending on its molecular weight and on it being a homo- or co-polymers. For example $T_1$=171° C. and $T_3$=133° C. for the PVDF of the type marketed as Solef® 6020.

The value of $T_2$ is the melting point of main polymer binder of the plate. For example, polyphenylene sulfide is a typical one for application in HTPEM fuel cells and it has melting point from 272° C. to 290° C. depending on its morphology and degree of crystallinity, as also explained in the article Rahate A S, Nemade K R, Waghuley S A. Polyphenylene sulfide (PPS): state of the art and applications, Rev Chem Eng 29 (2013) 471-489. Consequently, for this particular example, it $T_2$ is set to 272° C.

The values of $T_1$, $T_2$ and $T_3$ are varied in dependence of the PVDF type and the plate material.

Finally, the bipolar plates are taken out from the pressing tool and verified with respect to their leak tightness at required conditions.

In experiments, a HTPEM fuel cell stack was assembled based on these glued bipolar plates and its electrochemical performance was recorded with respect to their voltage drop with time. The measurements are illustrated in FIG. 6.

As observed in FIG. 6, there is only a slight degradation rate of 0.12 mV/h over a time span of 5000 h-operation at 165° C. with the applied current density of 0.2 A/cm². This experiment confirmed excellent durability of PVDF layer made from the multi-component mixture as described above, which makes it highly suitable as an adhesive for application in HTPEM fuel cells.

The invention claimed is:

1. A method for bonding two plates together for a fuel cell, wherein the method comprises applying an adhesive to the surface of at least one of the plates and pressing the two plates together with the adhesive in between until the adhesive bonds the plates together, wherein the adhesive contains a mixture of PVDF and a solvent, wherein the method comprises providing the adhesive by mixing PVDF and solvent and heating and stirring the mixture for dissolution of the PVDF in the solvent at a PVDF concentration in the adhesive; wherein the method comprises mixing PVDF in the solvent to a concentration in the range of 0.01% to 30% by weight PVDF relatively to the weight of the solvent for providing the adhesive.

2. A method according to claim 1, wherein the method comprises mixing non-ionic surfactant to the PVDF and solvent at a volume concentration in the range of 0.1% to 10% relatively to the solvent volume.

3. A method according to claim 1, wherein the method comprises adding water to the adhesive while the adhesive is on the surface and by the water causing precipitation of PVDF.

4. A method according to claim 1, wherein the method comprises applying the adhesive to the surface at room temperature for evaporation of the solvent from the glue at room temperature.

5. A method according to claim 1, wherein the method comprises pressing the two plates together with a pressure in the range of 1 kPa to 10 kPa.

6. A method according to claim 1, wherein the method comprises hot-pressing the two plates together at a temperature above the melting temperature of the PVDF and then reducing the temperature while still pressing until the temperature is below the crystallization temperature of the PVDF.

7. A method according to claim 1, wherein the method comprises mixing the adhesive by adding solvent that comprises more than 50% dimethyl acetamide.

8. A method according to claim 1, wherein the method comprises mixing the adhesive by adding surfactant that comprises more than 50% octyl phenol ethoxylate.

9. A method according to claim 1, wherein the method comprises mixing solvent with PVDF and surfactant at a volume concentration in the range of 0.1% to 10% relatively to the solvent volume to obtain the adhesive, wherein the solvent comprises more than 50% dimethyl acetamide and the surfactant comprises more than 50% octyl phenol ethoxylate; after the mixing applying the adhesive to the surface; after application of the adhesive to the surface, adding water to the adhesive and causing precipitation of PVDF by the addition of water; awaiting evaporation of the solvent at room temperature and then bonding the plates to each other by hot-pressing the plates together with a pressure in the range of 1 kPa to 10 kPa and at a temperature above the melting temperature of the PVDF and then reducing the temperature while still pressing until the temperature is below the crystallization temperature of the PVDF.

10. A method according to claim 1, wherein the plates are a cathode plate and an anode plate, and the method comprises bonding the plates to each other to form a bipolar plate for the fuel cell or bonding the plates to either side of a cooling plate to form a bipolar plate assembly with a central cooling plate sandwiched between the anode plate and the cathode plate.

* * * * *